United States Patent

De Gelis

[11] Patent Number: 5,528,948
[45] Date of Patent: Jun. 25, 1996

[54] ACTUATING DEVICE PROVIDED WITH A PULL AND RESILIENT RETURN JACK

[76] Inventor: Christian De Gelis, Colliers, 41500 Muides S/Loire, France

[21] Appl. No.: 172,239

[22] Filed: Dec. 23, 1993

[30] Foreign Application Priority Data

Dec. 30, 1992 [FR] France .................. 92 15927

[51] Int. Cl.⁶ .................................. B66D 1/00
[52] U.S. Cl. ................. 74/89.22; 74/106; 254/387
[58] Field of Search .............. 74/106, 89.2, 89.22; 254/387; 192/143

[56] References Cited

U.S. PATENT DOCUMENTS

| | | | |
|---|---|---|---|
| 1,552,833 | 9/1925 | Fischbach | 74/106 |
| 2,884,788 | 5/1959 | Clark | 74/89.22 |
| 2,896,908 | 7/1959 | Stone | 254/387 |
| 2,987,937 | 6/1961 | Sala | 74/89.22 |
| 3,765,648 | 10/1973 | Rasmussen et al. | |
| 4,074,892 | 2/1978 | Harken. | |
| 4,473,010 | 9/1984 | Dietz et al. | 254/387 |
| 4,647,014 | 3/1987 | Ekman | 254/387 |
| 5,078,364 | 1/1992 | Harrell | 254/387 |
| 5,143,507 | 9/1992 | Haugen et al. | |
| 5,221,075 | 6/1993 | Habicht | 254/387 |

FOREIGN PATENT DOCUMENTS

| | | |
|---|---|---|
| 709875 | 8/1931 | France. |
| 441280 | 1/1936 | United Kingdom. |

Primary Examiner—Katherine Matecki
Attorney, Agent, or Firm—Larson and Taylor

[57] ABSTRACT

An actuating device intended for spacially moving a mobile part in relation to a fixed point, characterized in that it includes a motor (1) driving, around its shaft (2), a winding element (4) pulling a mobile lifting element (9) connected to a fixed point (22) used as anchoring point for the flexible element (4) and sliding, perpendicularly to the axis of the thus constituted pulley block mechanism, in a tube-shaped guide (15) inside which it is housed and compressing a return spring (10) ensuring the return in extension of the mobile element (9), in such a way that this device works in traction and without any buckling stresses.

8 Claims, 3 Drawing Sheets

ACTUATING DEVICE PROVIDED WITH A PULL AND RESILIENT RETURN JACK

FIELD OF THE INVENTION

The invention relates to a driving device intended for spatially moving a mobile object in relation to a fixed point.

BACKGROUND OF THE INVENTION

Driving mechanisms of this type can be used, in particular, for lifting head and leg pieces of arm-chairs and beds, for orienting dish aerials, as well as for remote controlling any kind of inaccessible levers.

The purpose of the invention is to provide a driving device for the above-mentioned uses, in such a way that, with very reduced room requirements, the driving device can feature a very wide displacement range and the various elements constituting the device can be of a very simple arrangement and assembly and can be manufactured at very low cost price.

To these ends, a driving device of the aforesaid type is essentially characterized in that, being arranged according to the invention, it comprises a motor driving, around its shaft, a winding element pulling a mobile lifting element attached to a fixed point used as anchoring point for the flexible and sliding element, perpendicularly to the axis of the thus constituted pulling block mechanism, in a tube-shaped guide inside which it is housed and compressing a return spring ensuring the return in extension of the mobile element, in such a way that this device works in traction and without any buckling stresses. Preferably, demultiplying means are provided in order to increase the performances of the device; advantageously said demultiplying means include at least a roller arranged as a pulley block, and practically several rollers arranged as a stepped or multistage pulley block around which the winding element winds up and which, preferably, may be selected from a metal strip, a chain, a flexible sling rope, such as a steel string or music wire.

It is therefore possible to constitute the device with very low room requirements, especially as to height, making it possible for example to incorporate same without any difficulty in a bed framework, thereby avoiding that the pieces or parts of pieces be in projection and may injure the user.

To stabilize the mobile element moved by the device and in order to ensure that it remains parallel to a reference direction (particularly in the case of a raisable end of a bed), it is of interest that the mobile element be connected to a coaxial tube supporting pairs of opposite arms mutually in engagement with their adjacent ends respectively and in hinged connection by their other end to the two mutually displaceable parts under the action of the driving device, whereby said arms forming at least a deformable rhombus ensure a mutually parallel displacement of both parts.

BRIEF DESCRIPTION OF THE DRAWINGS

The invention will be best understood from the following detailed description of some preferred embodiments, given only as non-limiting examples. In this description, reference is taken to the accompanying drawings in which.

DESCRIPTION OF THE PREFERRED EMBODIMENTS

Figure 1:
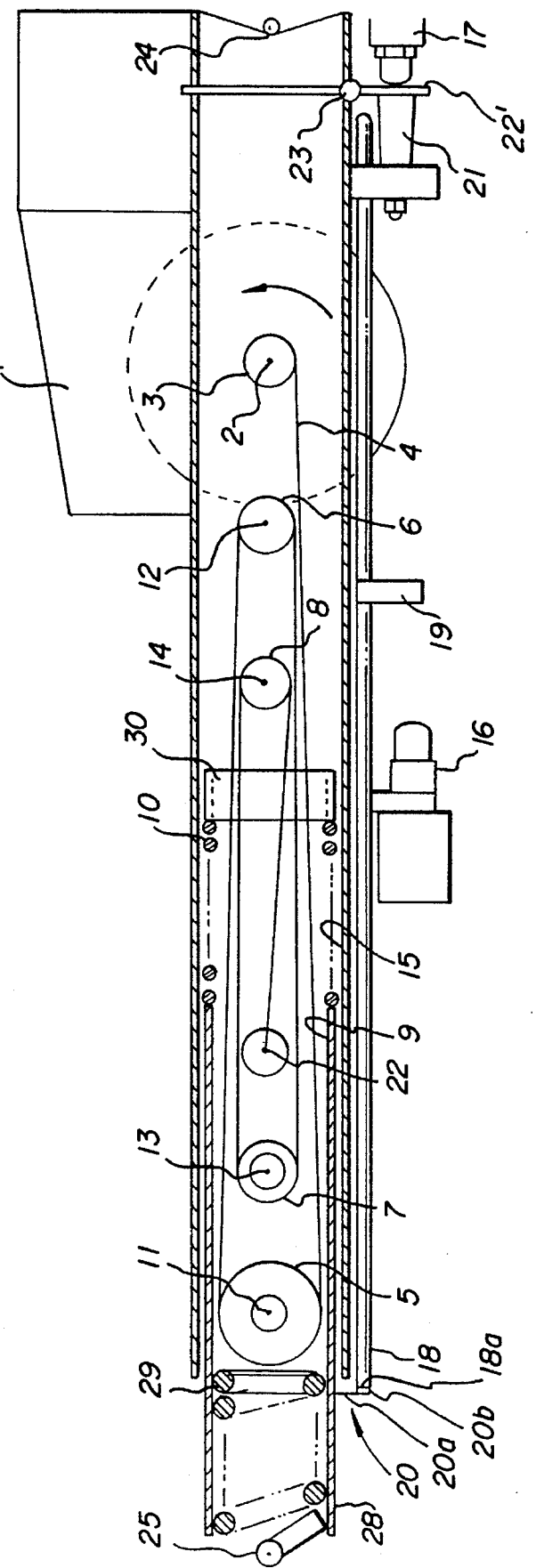
FIG. 1 is a longitudinal section of a preferred embodiment of a driving device arranged according to the invention.
Figure 2:
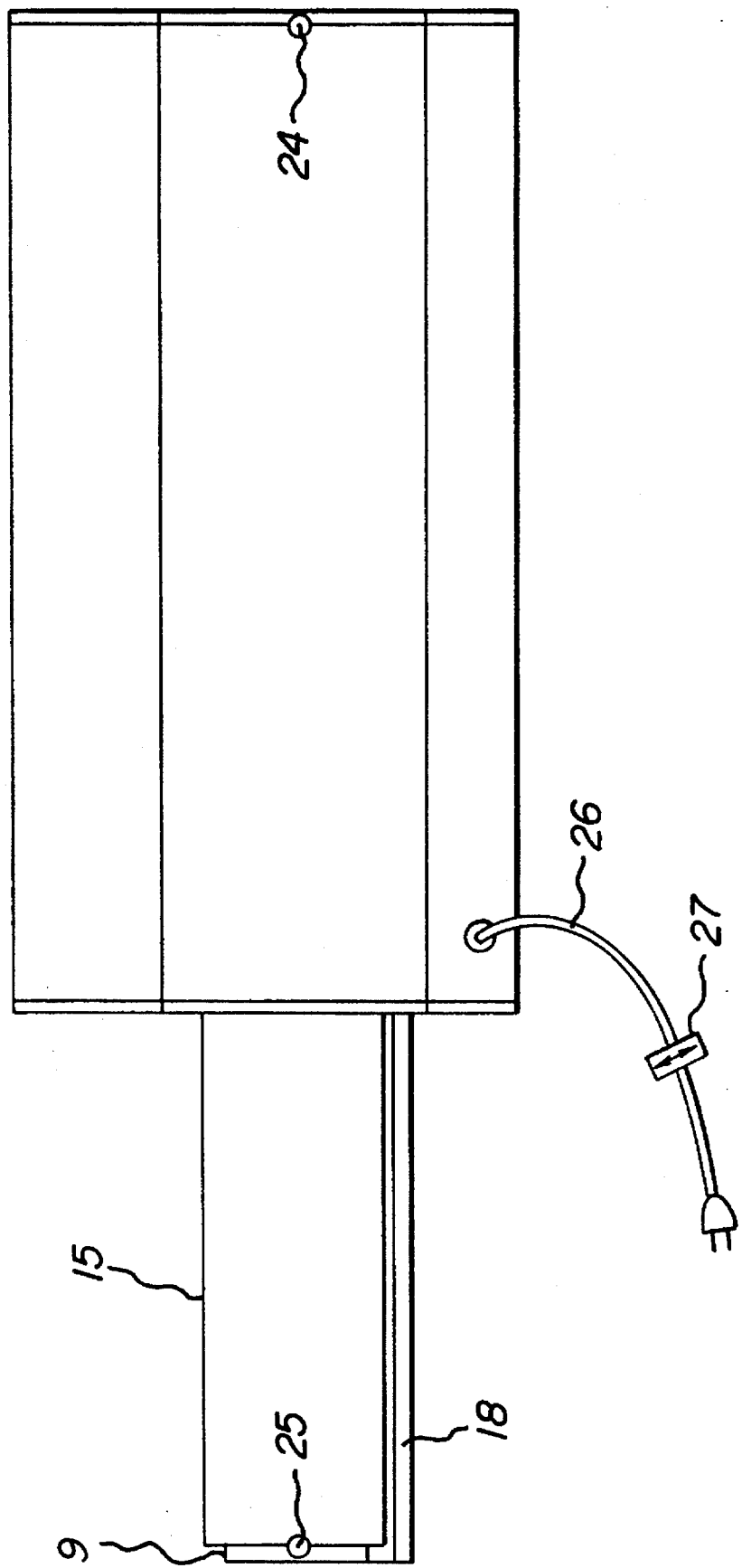
FIG. 2 is a side view of the whole of the driving device according to FIG. 1.

First of all, with reference to FIG. 1 and 2, a driving device constituted according to the invention, for spacially moving or displacing a mobile object in relation to a fixed point, comprises a motor 1 driving, around its shaft 2, a winding element 4 pulling a mobile lifting element 9 connected to a fixed point 22 used as anchoring point for the flexible element 4 and sliding, perpendicularly to the axis of the thus constituted pulley block mechanism, in a tube-shaped guide 15 inside which it is housed and compressing a return spring 10 ensuring the return in extension of the mobile element 9, thus acting as a jack.

The flexible, winding element 4 may be a metal strip; or also a chain made up of articulated elements with a constant pitch, permitting its traction or pull to take place by a sprocket replacing the winch 3, integral with the shaft 2, in order to obtain a constant pulling or traction force; or also a flexible sling rope, for example a steel string or music wire.

Preferably, the motor 1 is associated with demultiplying means which, advantageously, comprise at least a roller 5 arranged as a pulley block. The demultiplying ratio of the mechanism can of course be increased by adding additional rollers, as shown by the rollers 5, 6, 7 and 8 on FIG. 1, and by increasing the number of winding turns or strands of the flexible element 4 so as to constitute a stepped or multistage pulley block.

Rollers with various diameters 5, 6, 7 and 8 are supported by the axes 11 and 13 inside the mobile lifting element 9 and by the axes 12 and 14 inside the guide 15, which makes it possible to eliminate the risk of friction of the strands or successive layers of the flexible element 4 on itself. Such an arrangement can be carried out as a whole in a very flattened form as shown in FIG. 1.

Therefore, the flexible element 4 attached to the anchoring point 22 integral with the base of the mobile element 9 winds around the first roller 8 with a small diameter and integral with the guide 15, located in the vicinity of the stop 30 of the return spring 10 and in all cases between this stop and the winch 3; the flexible element 4 then extends towards the second roller 7 with a larger diameter located between the anchoring point 22 and the largest roller 5 integral with the mobile element 9, then winds around said roller 7 in order to subsequently run around a roller 6 with a larger diameter, located on the guide 15 between the winch 3 and the roller 8; it then reaches the largest roller 5 and winds around the latter, then it is fixed on the winch 3. The five strands of this pulley block are not restricted in number and the number of strands must be adapted to the power of the motor and the strength to be generated. The axes 11, 12, 13 and 14 must be maintained parallel and means must be provided in order to prevent the rotation of the mobile element 9 inside its guide 15, for example by forming the tube elements 9 and 15 as polygonal sliding tubes or as splined or keyed round tubes, or also as tubes with oval sections.

According to a first embodiment, advantageous because of its simple implementation (for example, used for controlling the pivoting action of mobile parts of beds), the motor 1 is of the electric type, for example extremely flat with permanent magnet, and an automatic stop system is provided for the motor and incorporates limit switches for extension 16 and retraction 17 capable of being actuated by a rod assembly 18 and an adjustable catch 19 mounted thereon. The rod assembly 18 is driven parallel to the tube element 9 and connected to the tube element by a resilient transmission assembly 20. The resilient transmission assembly 20 includes a support 20a fixed at one end to the tube element 9 and extending radially therefrom. The other end of the support 20a is fixed to the free and 18a of the rod assembly 18 by a resilient block 20a. The use of a resilient block 20b helps to prevent damage to the device when the catch 19 engages one of the limit switches 16, 17 by reducing any shock transmitted by rod assembly 18. The limit switch 17 in the retracted position of the mobile element 9 is further characterized in that it can be pilot operated by an "all or nothing" magnet tripping device 21 which, when affected by the rod assembly 18, pushes the mild iron plate 22' pivotably mounted on an axis 23, separates same abruptly from the permanent magnet 21 after having stored sufficient energy for the resilient transmission 20 and abruptly actuates the switch 17 which assumes an abruptly opened position; this mechanism is not necessary on the extension end of the stroke since at this stage the driving device generates a strength close to zero.

According to another embodiment, the electrical limit switch device as described above can also monitor and control the fluid supply to the solenoid valve of a braked pneumatic motor or of a hydraulic motor equipped with an electric brake, used as an alternative to the electric motor.

FIG. 2 shows the driving device as a hooded element ready for assembly. The fastening operations onto a fixed object and removable object take place by means of a mobile axis 24 and a removable axis 25 respectively, the latter being associated with an integrated overload damper, for example a spring 28 connected to the internal end 29 of the mobile element 9 beyond the roller with the large diameter 5. An electric connection cable 26 makes it possible to operate the device on a remote control basis thanks to the incorporation of a reversing switch 27, selecting the direction of operation, the electric power being taken from the electric mains or from the terminals of a battery or alike.

The merit of the device according to the invention lies in the fact that it works in traction and therefore without any buckling stress.

A typical example of the embodiment of a driving device of the aforesaid type can be as follows: as driving motor, one uses an extremely flat permanent magnet geared motor 1 of the type used for window lifting devices in cars and developing, at its output shaft, a torque of 1 m.daN winding the strip 4 around a winch 3 with a diameter of 1 cm, which results in a traction or pull force of 100 daN multiplied by 5 due to the five strand-pulley block, i.e. approximately 500 m.daN.

Figure 3:
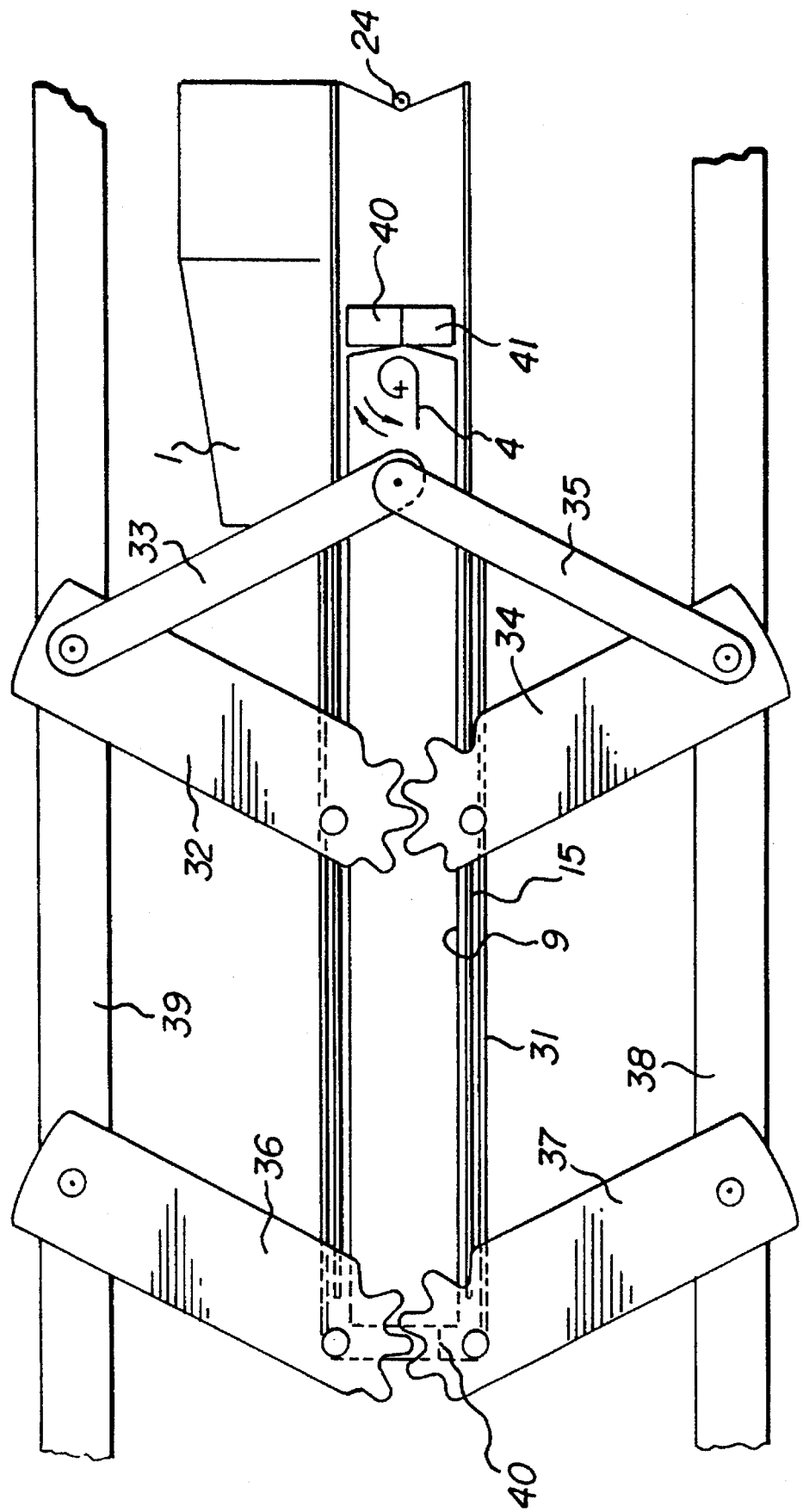
FIG. 3 is a side view of a stabilizing mechanism of the mobile element, capable of being connected to the device of FIG. 1 and 2.

FIG. 3 shows schematically a particular embodiment of the device according to the invention, adapted for the displacement of two mutually parallel parts, particularly of elongated ones (for example bars).

In this arrangement, the mobile element 9 is connected in 40 to a coaxial external tube 31 supporting pairs of opposite arms 32, 34, 33, 35, 36, 37 mutually engaged with their adjacent ends respectively and integrally articulated with their other end to two parts (for example elongated parts in the shape of bars) 38, 39 mutually displaceable under the action of the driving device, whereby said arms form at least a deformable rhombus ensuring a mutually parallel displacement of two parts 38, 39. It is thus desirable that the limit switches 40, 41 be located inside the guide tube 15. Provision can be made for a limit switch 41 operating in the case of the extension which is adapted to detect the tripping action of a flexible element 4 and provide the actuator with a variable and automatic safety stroke.

Such an arrangement is particularly of interest when used to raise a mobile part of a bed: the lower part 38 is then a transversal bar or an end crossbeam of a stationary framework of the bed, whereas the part 39 is a transversal bar or crossbeam of the framework of the movable part of a bed capable of being vertically displaced by pivoting action in relation to the stationary framework. In this configuration, the driving device according to the invention is mounted in a floating way by being attached to the parts 38 and 39 with said arms, and remains at a substantially equal distance from the parts 38 and 39 during the mutual displacement of same. In this particular type of implementation, one can be assured that the parts 39 cannot slope downwards in relation to the part 38 even if the load which it supports, in the raised position, is not symmetrically distributed (for example, a person lying on one side of the bed partially raised).

I claim:

1. An actuating device for moving a mobile part with respect to a fixed part, comprising:

a tube-shaped guide connectable to one of said fixed and mobile parts;

an inner elongate element connected to the other of said fixed and mobile parts and arranged to slide telescopically in said tube-shaped guide;

a motor supported by said tube-shaped guide and having an outlet shaft extending transversely, in said tube-shaped guide for pulling said inner elongate element in only one displacement direction with respect to said tube shaped guide, without any possible pushing effect for displacement of said inner elongate element in a reverse displacement direction with respect to said tube-shaped guide;

demultiplying means comprising a multistage pulley block comprising pulleys positioned inside at least one of said tube-shaped guide and said inner elongate element, one of said pulleys comprising a driving pulley fitted on said outlet shaft, said demultiplying means further comprising a windable element with a first end connected to said inner elongate element and a second end wound around said driving pulley; and a return spring for engaging said inner elongate element and displacing said inner elongate element in a direction opposite said one displacement direction.

2. An actuating device according to claim 1 wherein the windable element is selected from the group consisting of a metal strip, a chain, and a flexible sling rope.

3. An actuating device according to claim 1 wherein said de-multiplying means comprises four pulleys having different diameters and arranged on separate axes each of said axes being positioned inside at least one of the inner elongate element and the tube-shaped guide.

4. An actuating device according to claim 1 wherein the motor is selected from the group consisting of an extremely flat permanent magnet electric motor, a pneumatic motor with electric brake piloted by electric limit switches and a braked hydraulic motor controlled by a solenoid valve piloted by electric limit switches.

5. An actuating device according to claim 1 further comprising a spring connected to an end of said inner elongate element as a safety device in case of overload.

6. An actuating device according to claim 1 wherein the inner elongate element is connected to a coaxial external tube supporting pairs of opposite arms mutually engaged by their adjacent ends and integral at their opposite ends with two mutually displaceable parts under the action of the actuating device, whereby said arms form at least a deformable rhombus ensuring a mutually parallel displacement of the two displaceable parts.

7. An actuating device according to claim 1 further comprising limit switches located inside the tube-shaped guide.

8. An actuating device according to claim 7 wherein one of the limit switches detects a tripping action of the windable element and provides the actuating device with a variable and automatic safety stroke.

* * * * *